(12) United States Patent
Shih

(10) Patent No.: US 7,886,117 B2
(45) Date of Patent: Feb. 8, 2011

(54) METHOD OF MEMORY MANAGEMENT

(75) Inventor: Chieh-Wen Shih, Chang Hua (TW)

(73) Assignee: Realtalk Semiconductor Corp., Hsinchu (TW)

( * ) Notice: Subject to any disclaimer, the term of this patent is extended or adjusted under 35 U.S.C. 154(b) by 546 days.

(21) Appl. No.: 11/902,356

(22) Filed: Sep. 20, 2007

(65) Prior Publication Data
US 2008/0104340 A1 May 1, 2008

(30) Foreign Application Priority Data
Sep. 22, 2006 (TW) .............................. 95135051 A

(51) Int. Cl.
*G06F 12/00* (2006.01)
*G06F 9/26* (2006.01)

(52) U.S. Cl. .................. 711/154; 711/167; 711/201; 711/E12.069; 711/E12.063

(58) Field of Classification Search ............... None
See application file for complete search history.

(56) References Cited

U.S. PATENT DOCUMENTS 6,393,534 B1 * 5/2002 Chen et al. ................. 711/158
7,007,138 B2 * 2/2006 Mochida et al. ............ 711/151

* cited by examiner

*Primary Examiner*—Reginald G Bragdon
*Assistant Examiner*—Eric Loonan
(74) *Attorney, Agent, or Firm*—Muncy, Geissler, Olds & Lowe, PLLC

(57) ABSTRACT

A method of memory management is disclosed. The invention increases bank diversity by splitting requests and is also integrated with re-ordering and priority arbitration mechanisms. Therefore, the probabilities of both bank conflicts and write-to-read turnaround conflicts are reduced significantly, so as to increase memory efficiency.

13 Claims, 7 Drawing Sheets

METHOD OF MEMORY MANAGEMENT

BACKGROUND OF THE INVENTION

1. Field of the Invention

The invention relates to memories, and more particularly, to a method of memory management capable of increasing memory efficiency.

2. Description of the Related Art

Of all system-on-chips (SOCs), memory controllers process all data transfers and instruction scheduling. Thus, increasing memory efficiency is a determining factor for computing performance.

Currently, main memories, like SDRAM, DDR-DRAM, DDR2-DRAM and DDR3-DRAM, are usually divided into multiple banks where each bank consists of a number of rows. A row is then divided into columns. Based on this architecture, certain inherent limitations of memories result in a reduced memory efficiency. First, a bank conflict occurs while consecutive access requests are to the same bank but different rows (or pages). The total bank conflict time is the total of the "activate to read" ($t_{RCD}$) latency plus the "read to pre-charge" ($t_{RPD}$) latency plus the "pre-charge to activate" ($t_{RP}$) latency, or the "activate to activate command period" ($t_{RC}$), whichever timing constraint is longer. On the other hand, while consecutive access requests target different banks, the bank conflict will not occur and the system no longer needs to wait for the $t_{RC}$ latency.

FIG. 1 is a diagram showing two consecutive executed access requests targeting the same bank. For simplicity, assuming that memory 100 consists of only two banks $B_0$, $B_1$ and a $M_{th}$ access request (such as a read request) targeting from page 2 to page 1 of the bank $B_0$ has been already executed by a memory controller (not shown). Then the starting address of a subsequent ($N_{th}$) access request resides in page 1 of the bank $B_0$. At this moment, the bank conflict occurs since consecutive access requests are being made to the same bank $B_0$. Due to the bank conflict, the memory controller has to issue a pre-charge command to de-activate the bank $B_0$. Then an activate command to open the page 1 of the bank $B_0$ and, finally, a read command to the bank $B_0$ in order to complete the $N_{th}$ access request.

The second inherent limitation of memories resulting in a reduced memory efficiency is the write-to-read turnaround conflict. To the data bus, the read operation and the write operation result in opposite directions of data flow; therefore, it takes time to reverse the direction of the data bus while two consecutive access requests with different access types are being executed. In addition, refresh operations and command conflicts may also affect memory efficiency and thus will not be described since they are not the subject of the specification. In addition, the bank conflict latency is much longer than the write-to-read turnaround conflict latency. Thus, it is necessary to reduce the probability of bank conflicts.

In virtue of the importance of memory efficiency and both the real-time access characteristic and the massive data transfer characteristic of multi-media video and audio products, the invention provides a method of memory management capable of improving memory efficiency and meeting the requirements of the multi-media video and audio products.

SUMMARY OF THE INVENTION

In view of the above-mentioned problems, an object of the invention is to provide a method of memory management, which maximizes bank diversity by means of splitting requests or is integrated with other related mechanisms to minimize bank conflicts and increase memory efficiency.

To achieve the above-mentioned object, the method of memory management of the invention comprises: determining whether each of pending access requests has a bank conflict with a previously executed access request; splitting at least one of the pending access requests with a pre-defined data length into plural sub-requests while each of the pending access requests has a bank conflict with the previously executed access request, wherein at least two sub-requests of the plural sub-requests contain different starting banks; and, executing the plural sub-requests, wherein at least one pending access request containing an idle starting bank is selected for execution from the pending access requests after each of the plural sub-requests is executed and before the subsequent sub-requests are executed.

A feature of the invention is that request split operations are performed to increase bank diversity and a re-ordering arbitration mechanism is integrated to reduce the probabilities of bank conflicts and increase memory efficiency, thereby increasing memory efficiency. Besides, a priority arbitration mechanism meets the requirements of multi-media video and audio products with real-time and high-quality characteristics.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

The method of memory management of the invention will be described with reference to the accompanying drawings.

In order to increase memory efficiency, bank conflicts have to be minimized for reducing the significant $t_{RC}$ latency. Integrated with other related mechanisms, the invention primarily splits requests to increase bank diversity, thereby reducing the probability of bank conflicts and increasing memory efficiency.

Figure 1:
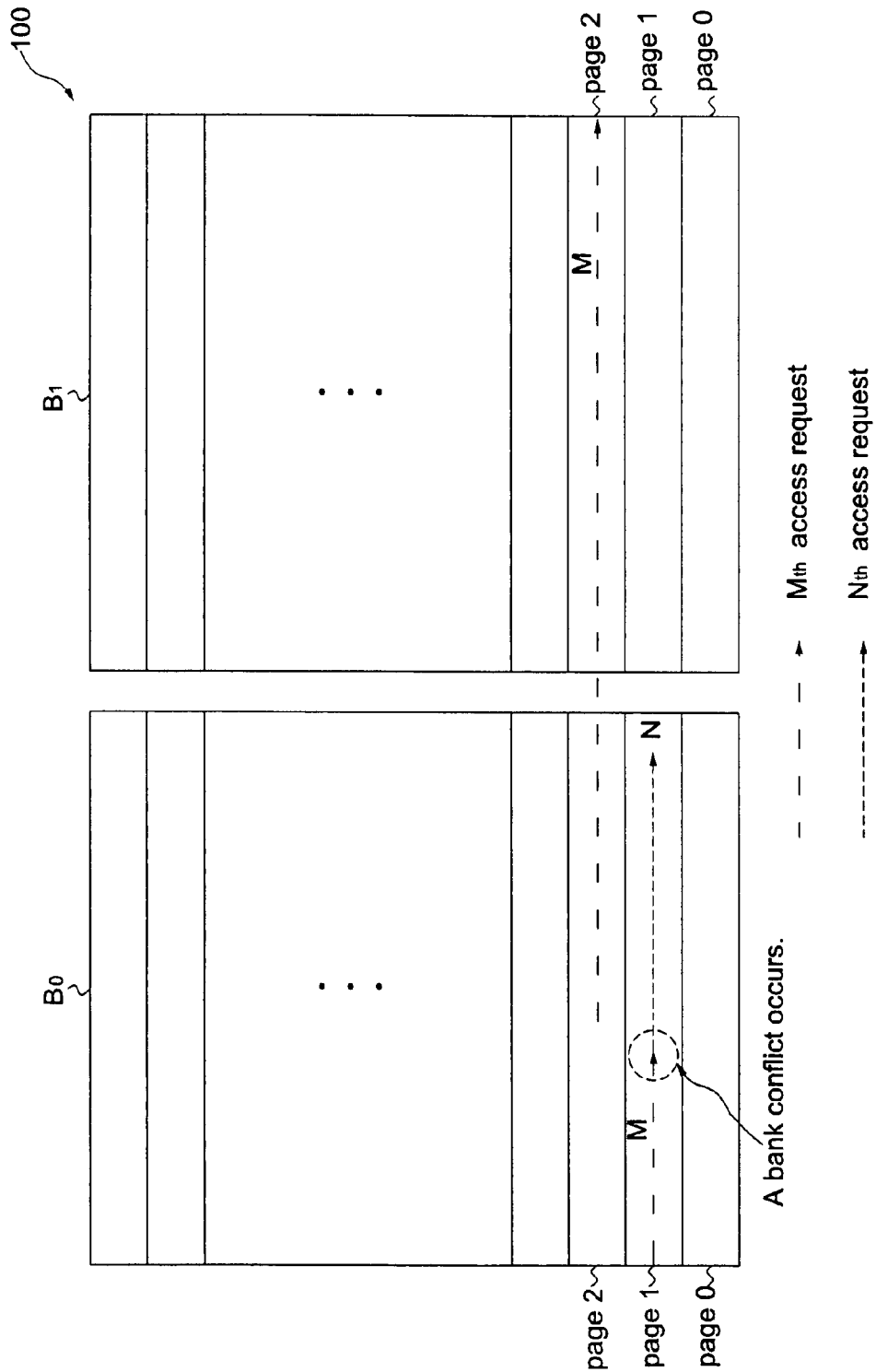
FIG. 1 is a diagram showing two consecutive executed access requests targeting the same bank.
Figure 2A:
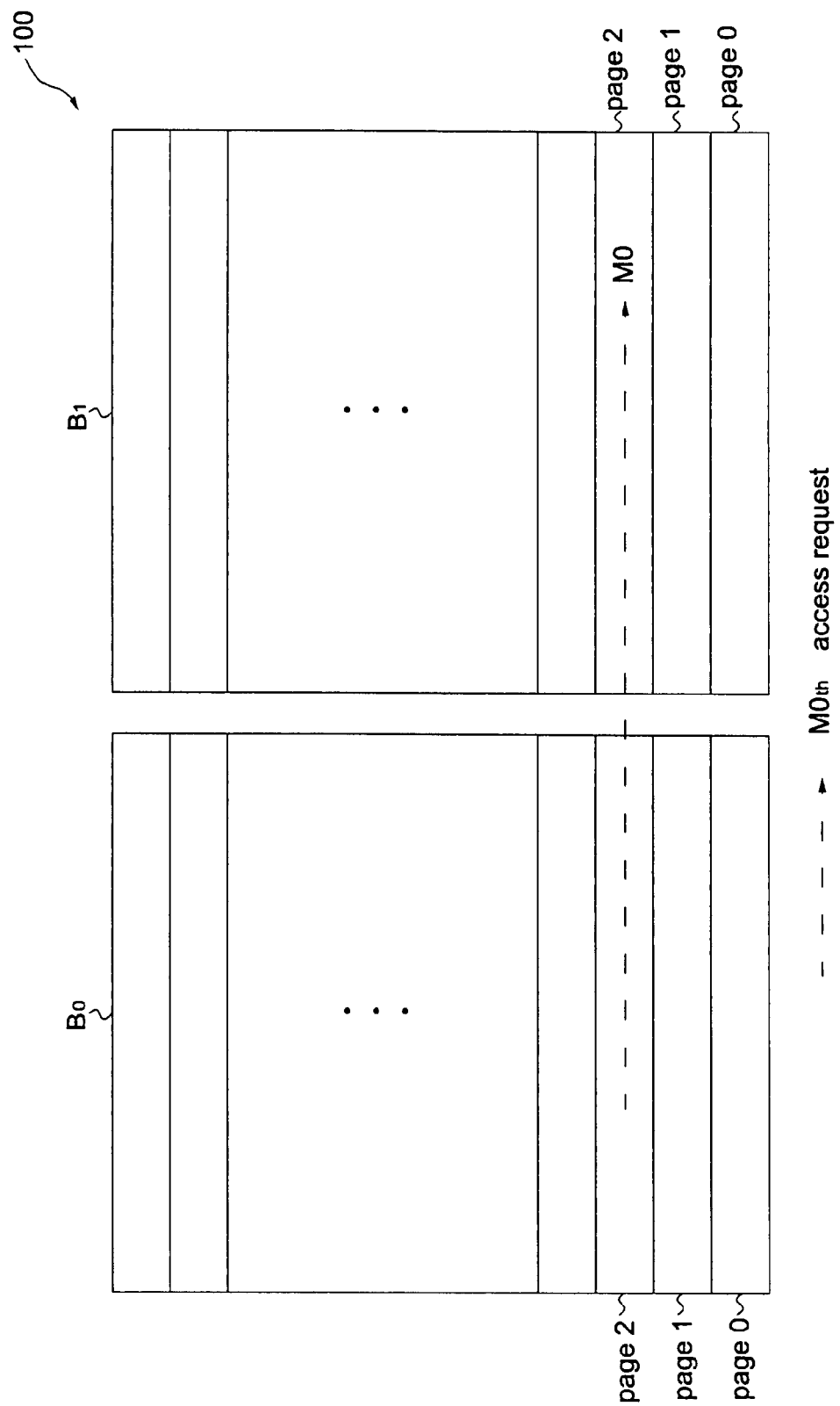
FIGS. 2A-2C show diagrams of performing a request split operation while a bank conflict occurs according to an embodiment of the invention.
Figure 2B:
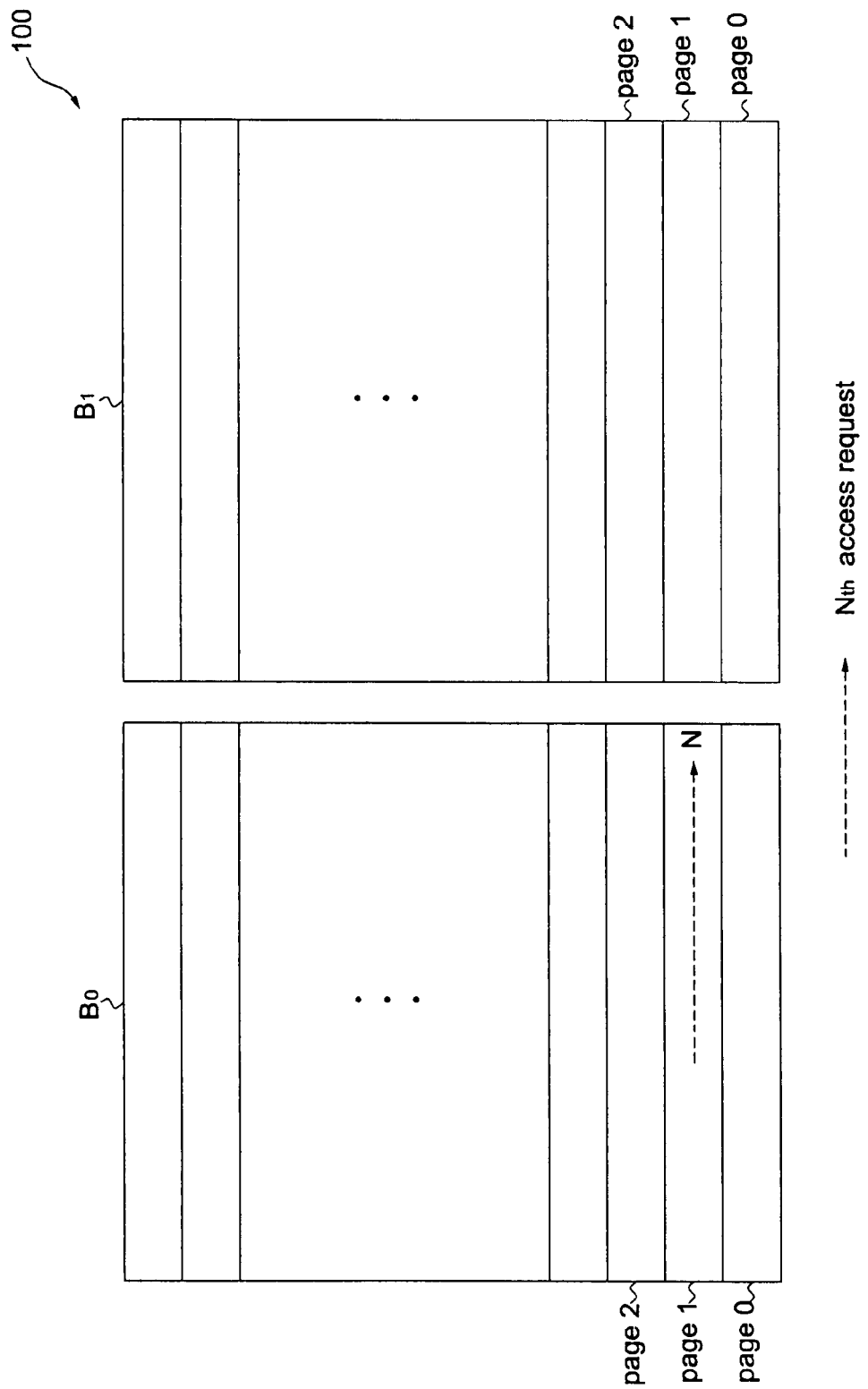
Figure 2C:
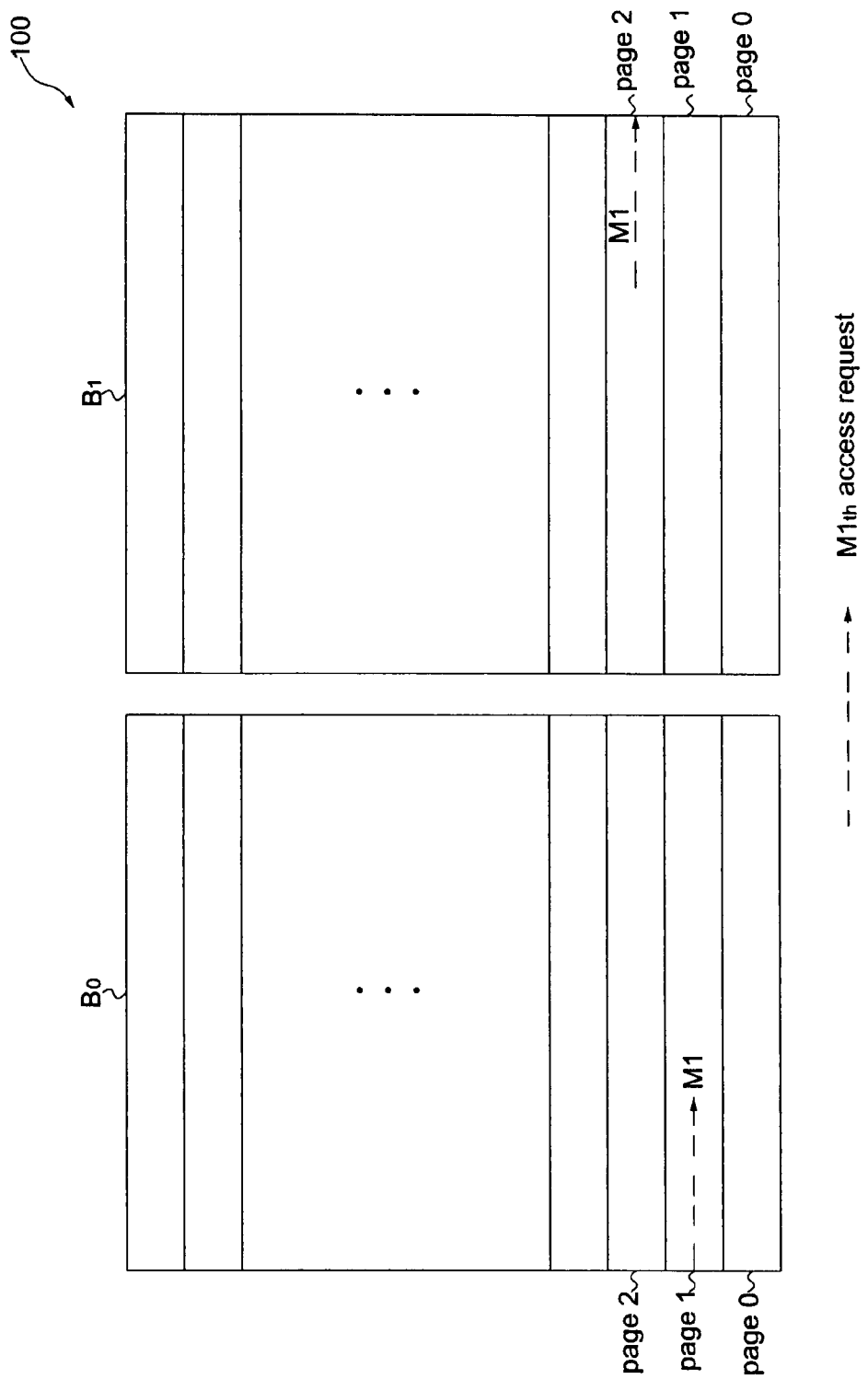

FIGS. 2A-2C illustrate diagrams of performing a request split operation while a bank conflict occurs according to an embodiment of the invention. As shown in FIG. 1, a bank conflict exists between two consecutive access requests (such as read requests), a $M_{th}$ access request and a $N_{th}$ access request, directed to the same bank $B_0$. Referring to FIGS. 2A-2C, according to this embodiment, at first, the $M_{th}$ read request is split into two read sub-requests, i.e., a $M0_{th}$ read sub-request and a $M1_{th}$ read sub-request. Initially, the starting address for the $M_{th}$ read request resides in page 2 of bank $B_0$ and the end address for the $M_{th}$ read request resides in page 1 of bank $B_0$. After splitting, the starting address for the $M0_{th}$ read sub-request still resides in page 2 of bank $B_0$ but the end address for the $M0_{th}$ read sub-request resides in page 2 of bank $B_1$. Meanwhile, the starting address for the $M1_{th}$ read sub-request resides in page 2 of bank $B_1$ and the end address for the $M1_{th}$ read sub-request resides in page 1 of bank $B_0$. In sequence, the memory controller executes the $M0_{th}$ read sub-request (as shown in FIG. 2A) first, then the $N_{th}$ read request (as shown in FIG. 2B), and finally, the $M1_{th}$ read request (as shown in FIG. 2C). The starting address for the $N_{th}$ read request, residing in page 1 of bank $B_0$, does not correspond with the end address (that resides in page 2 of bank $B_1$) for the $M0_{th}$ read sub-request, whereas an end address for the $N_{th}$ read request, residing in page 1 of bank $B_0$, does not correspond with the end address (that resides in page 2 of bank $B_1$) for the $M1_{th}$ read sub-request. Thus, a bank conflict is avoided.

It should be noted that a long enough data segment is an essential prerequisite to performing a request split operation. That is, the data segment between the starting address and the end address has to cross at least one boundary between two different banks; otherwise, splitting requests is meaningless. Regarding the above-mentioned embodiment, the data segment for the $M_{th}$ read request extends from bank $B_0$ to bank $B_1$ and then from bank $B_1$ to bank $B_0$, thus meeting the requirement of splitting requests. In practice, a memory is approximately divided into 4-8 banks; meanwhile, the number of sub-requests is greater than or equal to 2 after performing the request split operation. Accordingly, the diversity of the starting bank and the end bank for each access request is increased, which reduces the probability of bank conflicts.

Figure 3:
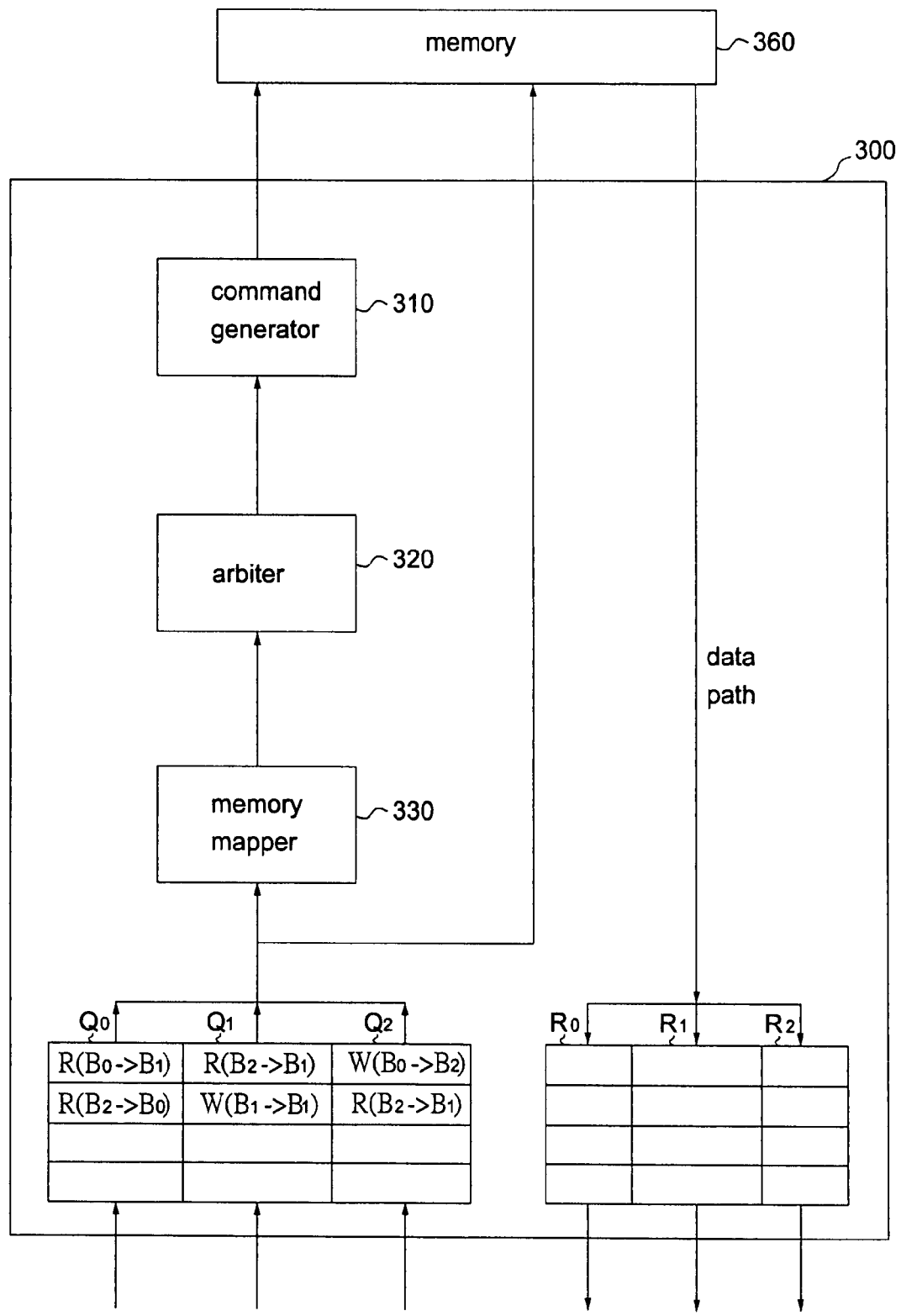
FIG. 3 shows a block diagram of a memory controller having three access request queues according to the invention.

FIG. 3 shows a block diagram of a memory controller having three access request queues according to the invention.

Referring to FIG. 3, a memory controller 300 includes a command generator 310, an arbiter 320, a memory mapper 330, three access request queues $Q_0$, $Q_1$, $Q_2$ and three response queues $R_0$, $R_1$, $R_2$. The memory mapper 330 decodes a memory address into a column address, row address, bank Address. The memory controller 300 serves and schedules the access requests in the three access request queues $Q_0$, $Q_1$, $Q_2$. According to an embedded arbitration mechanism, the arbiter 320 selects one of pending access requests to serve. Then, the command generator 310 generates a corresponding command to access the memory 360.

In terms of increasing memory efficiency, in addition to increasing bank diversity by means of splitting requests, the invention embeds a re-ordering arbitration mechanism in the arbiter 320 of the memory controller 300. In other words, the arbiter 320 can control the execution sequence of all pending access requests. For example, an access request that does not have a bank conflict with the previously executed access request is selected from the first pending access request in each access request queue. Alternatively, the access type of an access request selected from the first pending access request in each access request queues is the same as that of the previously executed access request, thus avoiding a write-to-read turnaround conflict. As a result, the re-ordering arbitration mechanism significantly reduces the probabilities of both bank conflicts and write-to-read turnaround conflicts and increases memory efficiency as well.

It should be noted that a conventional memory controller includes a command queue that initially collects all access requests in each access request queue and then executes the pending access requests in sequence based on its embedded arbitration mechanism. However, it runs the risk of executing the pending access requests out of sequence and may cause malfunctions. In contrast, the memory controller 300 of the invention does not use the command queue usually included in conventional memory controller. In addition to reducing hardware cost, each pending access request in each access request queue needs to line up and wait before being served and executed, ensuring the execution sequence of the pending access requests in each access request queue. As shown in FIG. 3, suppose that the end address for the previously executed read request resides in bank $B_0$, and the format of each access request in each access request queue is expressed as : access type (starting bank →end bank). For example, if the first access request in queue $Q_0$ is $R(B_0 \rightarrow B_1)$, it denotes that its access type is a read operation, its starting bank is $B_0$ and its end bank is $B_1$. The arbiter 320 first compares the priority levels of the first access requests in each of three access request queues (the priority arbitration mechanism will be described hereinafter) and serves the access request with the highest priority level first. If these priority levels are equal, an access request that does not conflict with the previously executed access request (whose end bank is bank $B_0$) is selected according to the re-ordering arbitration mechanism. In terms of the example of FIG. 3, since the starting bank of the first access request in each of the other two access request queues is bank $B_0$, the only choice for the next executed access request is the first access request $R(B_2 \rightarrow B_1)$(whose starting bank is $B_2$). After the access request $R(B_2 \rightarrow B_1)$ is executed, the arbiter 320 can select one of two access requests $R(B_0 \rightarrow B_1)$, $W(B_0 \rightarrow B_2)$ in queues $Q_0$ Q2, both of which do not conflict with the access request $R(B_2 \rightarrow B_1,)$ , for execution since bank $B_1$ is activated and bank $B_0$ is in idle state. On condition that the first access request in each of three access request queues has a bank conflict with the previously executed access request, an access request whose starting address and end address cross at least one boundary between two different banks needs to be selected from the first access request in each of three access request queues for performing the request split operation. After the request split operation is performed, the diversity of the starting bank and the end bank for each sub-request is increased, and which helps the arbiter 320 re-order the sub-requests and the subsequent access requests, avoiding the bank conflict. Besides, to avoid the write-to-read turnaround conflict, access requests with the same access type (write or read) are consecutively executed whenever possible.

Figure 4:
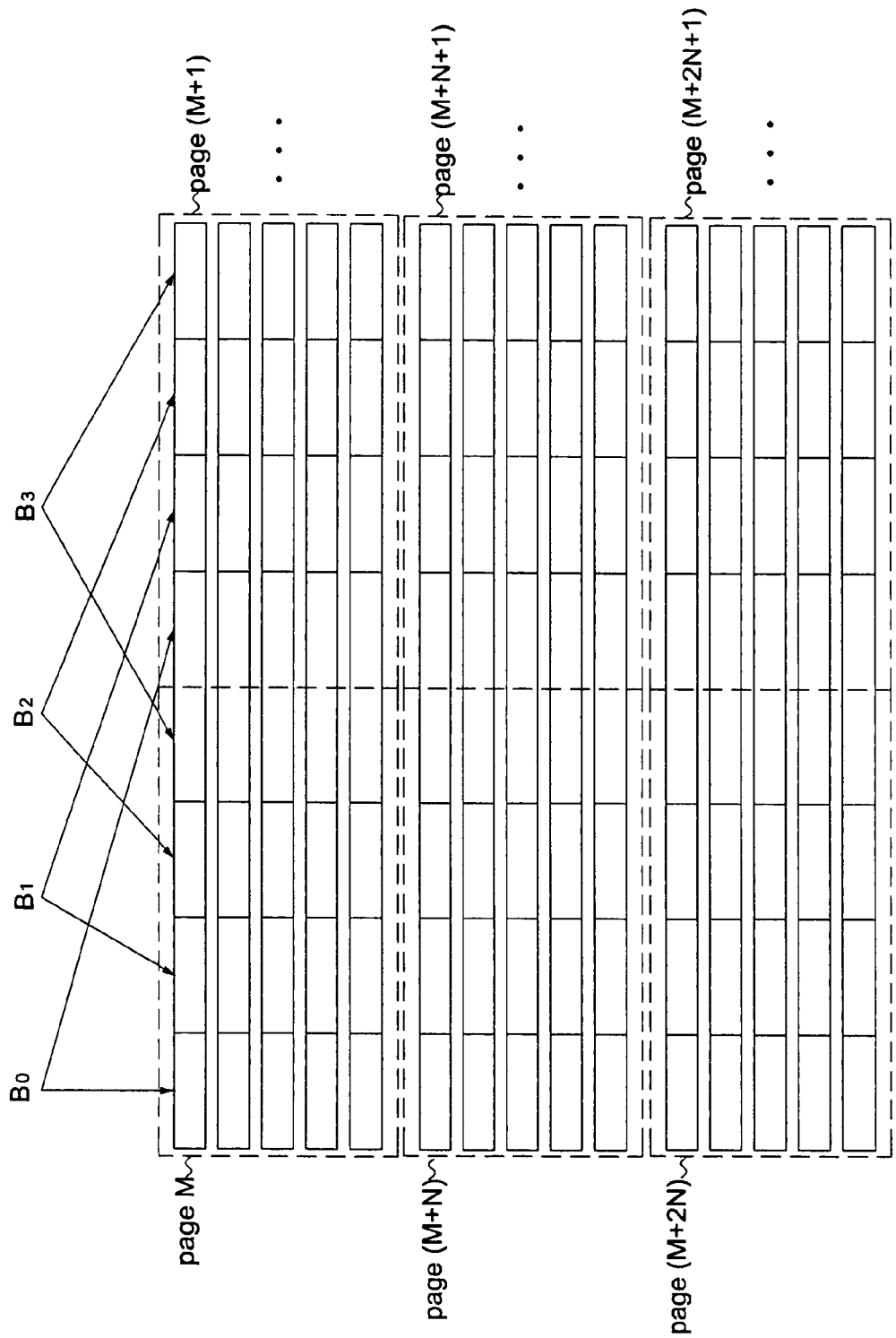
FIG. 4 is a diagram showing each page in a memory is divided into five segments.

FIG. 4 is a diagram showing each page in a memory is divided into five segments.

In addition to splitting request to increase bank diversity, the invention writes image data, a series of instructions or normal data into the memory by means of a block mode. Take FIG. 4 as an example, the data of each page is divided into five segments and then written into the memory. When the memory is accessed later on, a high probability of extending over plural banks is ensured, and which is convenient to perform the request split operation afterwards.

Furthermore, in terms of applications of multi-media video and audio products, in order to meet the requirements of wide-bandwidth, high memory efficiency and smooth display without any pause, the invention first gives a priority level to each access request and embeds a re-ordering arbitration mechanism in the arbiter 320 of the memory controller 300. While a plurality of access requests simultaneously request for serve, in order of priority levels, the arbiter 320 first serves the real-time requests (with higher priority levels) and then the non-real-time requests (with lower priority levels), to meet the real-time requirement of multi-media video and audio products. To avoid a long wait by a specified access request with a lower priority level, a higher priority level is given to the access request which has been waiting for a pre-defined time period, causing the access request to be served shortly. Moreover, splitting request can achieve a result of giving a portion of data to one real-time access request and then serving the next real-time access request, thereby solving the problem of all the bandwidth being occupied by access requests with higher priority levels, which is caused by the priority arbitration mechanism embedded in the arbiter 320. Finally, an access request with a shorter data length may be inserted after another access request with a higher priority level and a longer data length in order to increase the priority level of the access request originally having a shorter data length and a lower priority level.

Figure 5:
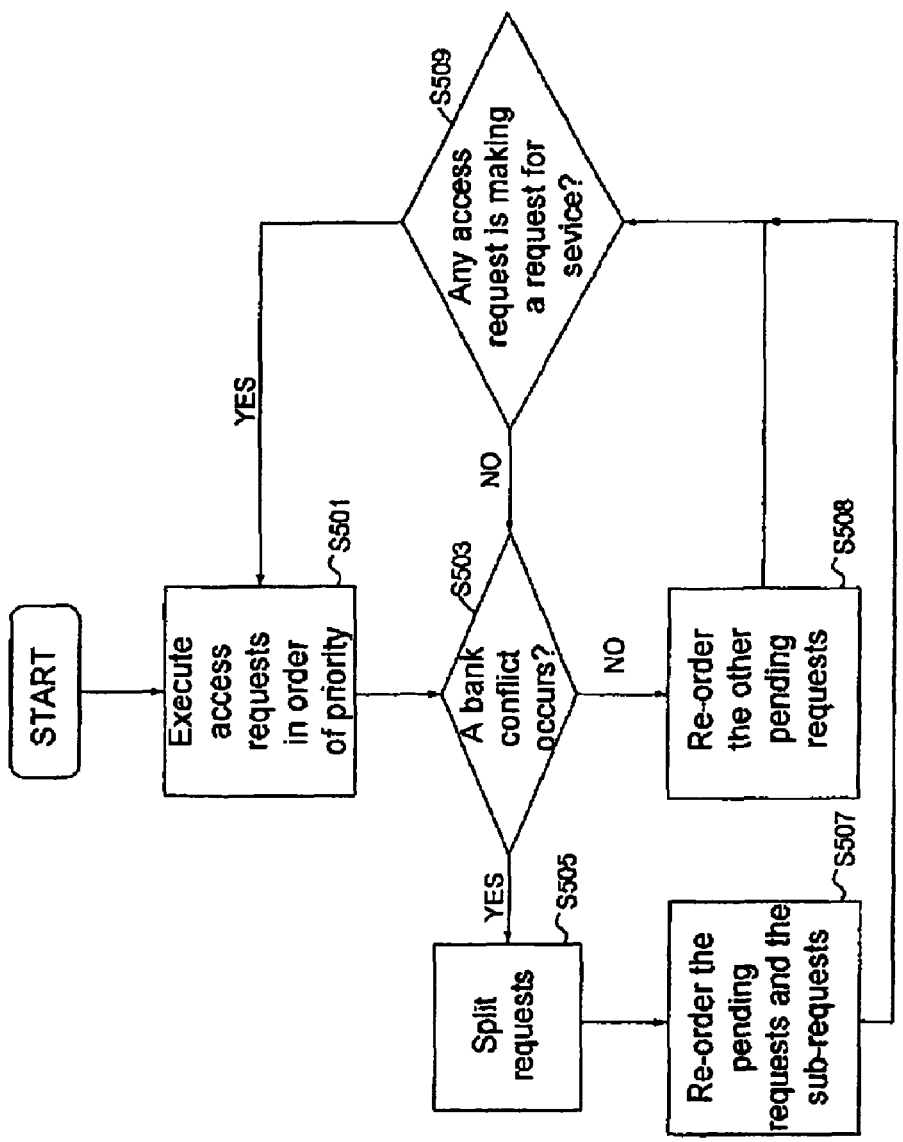
FIG. 5 is a flow chart illustrating a method of memory management according to the invention.

FIG. 5 is a flow chart illustrating a method of memory management according to the invention. The method of memory management of the invention is detailed as follows.

Step S501: In order of priority levels, the pending access request with the highest priority level is first selected for execution from the first pending access request in each of all access request queues.

Step S503: Determining whether each of the pending access requests has a bank conflict with a previously executed access request?. If "YES", the flow goes to the step S505; otherwise, the flow goes to the step S507.

Step S505: Perform a request split operation. An pending access requests with a predefined data length is selected and then split into multiple sub-requests, at least two of which containing different starting banks in order to increase bank diversity of the starting bank and the end bank for each access request.

Step S507: Re-ordering the sub-requests and the other pending access requests. If a request split operation is performed in the preceding step, then re-order the sub-requests and the other pending access requests. An interleaved execution method is utilized in an alternative embodiment of the invention, That is, at least one pending access request containing an idle starting bank is selected for execution from the pending access requests, after each of the sub-requests is executed and before the subsequent sub-requests are executed.

Step S508: Re-ordering the other pending access requests. If no request split operation is performed, then re-order the other pending access requests. While re-ordering, either the sub-request containing an idle starting bank or the subsequent access request containing an idle starting bank is selected to avoid bank conflicts. Besides, to avoid the write-to-read turn-around conflict, access requests with the same access type (write or read) are consecutively executed whenever possible.

Step S509: During the re-ordering period, if there is a pending access request with a high priority level making a request for service, the flow returns to the step S501; otherwise, the flow goes to the step S503.

Note that the above-mentioned re-ordering method is illustrative only, as it can be adjustable according to a variety of practical conditions. However, any implementation method capable of increasing bank diversity and avoiding bank conflict falls within the scope of the invention.

While certain exemplary embodiments have been described and shown in the accompanying drawings, it is to be understood that such embodiments are merely illustrative of and not restrictive on the broad invention, and that this invention should not be limited to the specific construction and arrangement shown and described, since various other modifications may occur to those ordinarily skilled in the art.

What is claimed is:

1. A method of memory management, comprising:
   determining whether each of pending access requests has a bank conflict with a previously executed access request;
   splitting at least one of the pending access requests with a data length into plural sub-requests while each of the pending access requests has the bank conflict with the previously executed access request, wherein at least two sub-requests of the plural sub-requests contain different starting banks; and
   executing the plural sub-requests, wherein at least one pending access request containing an idle starting bank is selected for execution from the pending access requests after each of the plural sub-requests is executed;
   wherein the data length crosses at least one boundary between two different banks.

2. The method according to claim 1, further comprising:
   executing at least one of the pending access requests with high priority levels.

3. The method according to claim 2, further comprising:
   automatically giving a higher priority level to at least one of the pending access requests which has been waiting for a pre-defined time period.

4. The method according to claim 1, further comprising:
   if no request split operation is performed, re-ordering the pending access requests; and
   while re-ordering the pending access requests, selecting at least one pending access request having an idle starting bank from the pending access requests for execution.

5. The method according to claim 4, wherein the at least one pending access request having an idle starting bank is selected according to an access type of the previously executed access request.

6. The method according to claim 1, wherein the pending access requests comprise first pending access requests in each of all access request queues and each of the first pending access requests has a highest priority level in its corresponding access request queue, further comprising:
   comparing priority levels of the first pending access requests; and
   executing one having the highest priority level from the first pending access requests.

7. A method of memory management, wherein each of pending access requests comprises a starting bank and an end bank, the method comprising:
   determining in sequence whether each of the pending access requests has a bank conflict with a previously executed access request and executing the pending access requests in sequence if no bank conflict occurs;
   splitting at least one of the pending access requests with a data length into plural sub-requests while each of the pending access requests has a bank conflict with the previously executed access request, wherein at least two of the plural sub-requests contain different starting banks; and
   executing the plural sub-requests, wherein at least one of the pending access requests is selected for execution after each of the plural sub-requests is executed;
   wherein the data length crosses at least one boundary between two different banks.

8. The method according to claim 7, further comprising:
executing the pending access requests with higher priority levels in order of priority levels.

9. The method according to claim 7, further comprising:
writing data into a memory by means of a block mode.

10. The method according to claim 8, further comprising:
automatically giving a higher priority level to at least one of the pending access requests which has been waiting for a pre-defined time period.

11. A method of memory management, comprising:
determining whether all pending access requests conflict with a previously executed access request;
splitting at least one of the pending access requests with a data length into plural sub-requests while all the pending access requests conflict with the previously executed access request, wherein starting banks of the plural sub-requests are different; and
executing the plural sub-requests, wherein at least one of the pending access requests containing an idle starting bank is selected for execution from the pending access requests after each of the plural sub-requests is executed;
wherein the data length crosses at least one boundary between two different banks.

12. The method according to claim 11, wherein the at least one of the pending access requests containing an idle starting bank is selected according to an access type of the previously executed access request.

13. The method according to claim 11, wherein the pending access requests comprise first pending access requests in each of all access request queues and each of the first pending access requests has a highest priority level in its corresponding access request queue, further comprising:
comparing priority levels of the first pending access requests; and
executing one having the highest priority level from the first pending access requests.

* * * * *